March 21, 1961  F. M. RYCK ET AL  2,975,458

WINDSHIELD WIPING SYSTEM

Filed Jan. 8, 1958

INVENTORS
FRANCIS M. RYCK
EUGENE R. ZIEGLER
BY
G. H. Strickland
THEIR ATTORNEY

United States Patent Office 2,975,458
Patented Mar. 21, 1961

2,975,458

WINDSHIELD WIPING SYSTEM

Francis M. Ryck, Rochester, and Eugene M. Ziegler, Spencerport, N.Y., assignors to General Motors Corporation, Detroit, Mich., a corporation of Delaware Filed Jan. 8, 1958, Ser. No. 707,817

2 Claims. (Cl. 15—250.27)

This invention relates to a windshield wiping system and, particularly, to a windshield wiping system for operating more than two wiper blades simultaneously.

An object of this invention is to provide a new and improved windshield wiping system.

Another object of this invention is to provide a windshield wiping system including three wiper blades, two of which mounted and operable to sweep outer lateral surface area of a windshield, and the third of which is mounted and operable to sweep surface area located intermediate the outer lateral surface area.

Another object of this invention is to provide a windshield wiping system having a plurality of wiper blades that oscillate in synchronism and serve to clean a larger area of so-called "wrap-around" or compound curvature windshields.

Another object of this invention is to provide a cleaning mechanism for windshields using three wiper blades and arms, two of which are adapted to have a stroke somewhat greater than 90° and one of which is adapted to have a stroke of substantially 180° in a location intermediate the strokes of the other two blades and arms, each blade and arm being synchronized relative to the others such that there is never any interference in blade and arm operation.

Another object of this invention is to provide a cleaning mechanism for compound-curved windshields swept by a pair of outer wiper blades carried by outer arm assemblies and also swept by an intermediate blade carried by a centrally mounted arm assembly which is driven by single driving motor means that is interconnected with fluid motors for actuating the outer arm and blade assemblies in synchronism relative to the outer arm and blade assemblies such that when the two outer blades reach a vertical position, the centrally-mounted blade is actuated and travels a portion of a stroke before the outer blades return to the vertical position from a terminus of a stroke in one direction, while the centrally-mounted blade travels another portion of a stroke as the outer blades move towards a terminus of their stroke in an opposite direction.

A further object is to provide a windshield wiping system and cleaning mechanism including three wiper blades, two of which are mounted in outer locations adjacent to one edge of a frame of the windshield and one of which is mounted in a location intermediate the outer locations but adjacent to an opposite edge of the windshield frame, the outer blades being carried by arms moved by transmission shafts whereby oscillation occurs in a stroke greater than 90° but less than 180° while the intermediate blade is carried by arms moved by a shaft driven through a substantially 180° stroke, using a single motor means for driving the intermediate wiper blade and for operating a fluid actuator for each of the outer blade shafts, each fluid actuator being connected in a closed conduit and chamber arrangement whereby the wiper blades are oscillated in synchronism and interference of one blade relative to another is avoided.

Further objects and advantages of the present invention will be apparent from the following description, reference being had to the accompanying drawings wherein a preferred embodiment of the present invention is clearly shown.

Figure 1:
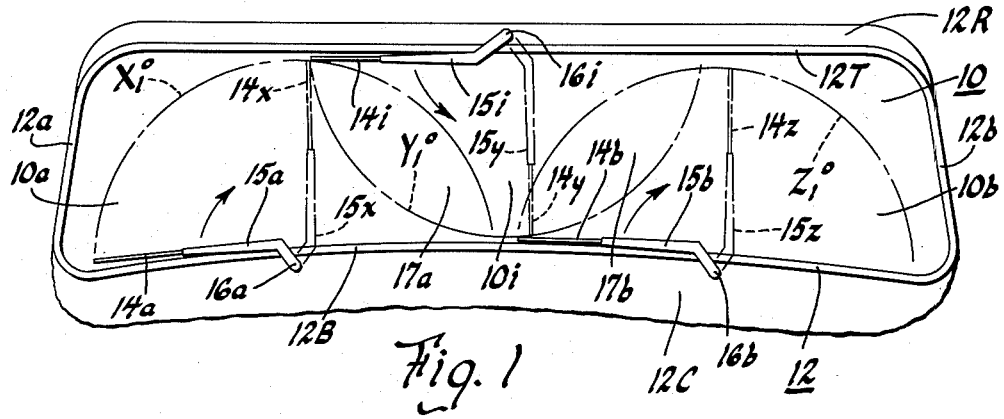
Fig. 1 is a fragmental view showing a compound-curved windshield provided in a frame of a vehicle body and having cleaning mechanism in accordance with the present invention.

With particular reference to Fig. 1, there is shown a "wrap-around" type or compound-curved windshield generally indicated by numeral 10. The windshield preferably is made of shatterproof glass or similar material and includes outer lateral surface portions 10a and 10b joined by an intermediate surface portion 10i. The windshield is mounted resiliently in sealed relationship relative to a frame generally indicated by numeral 12 and having a top frame portion, rail or edge 12T as well as a bottom frame portion, rail or edge 12B. The top and bottom portions are joined by frame end or rail portions 12a and 12b adjacent to outer surfaces 10a and 10b, respectively. The frame 12 is attached to a vehicle body having a cowl 12C and a roof portion 12R visible in Fig. 1. Wiper blades 14a, 14i, and 14b attached to arms 15a, 15i, and 15b, respectively, are provided as part of cleaning mechanism of the present invention. The arms 15a, 15i, and 15b are attached to and oscillated by wiper-transmission shafts 16a, 16i and 16b, respectively. Shafts 16a and 16b are provided adjacent to the bottom frame portion 12B in the embodiment of Fig. 1 wherein shaft 16i is shown provided adjacent to top frame portion 12T.

Figure 2:
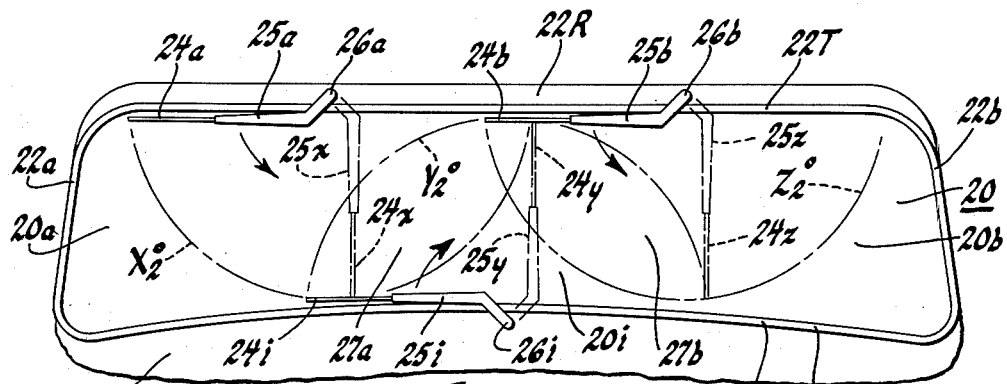
Fig. 2 is another fragmental view showing a "wrap-around" type windshield provided in a frame of a vehicle body and having cleaning mechanism in accordance with a modified form of the present invention.

In the embodiment of Fig. 2, a "wrap-around" or compound-curved windshield generally indicated by numeral 20 is provided having outer lateral surface areas 20a and 20b and intermediate surface area 20i. A frame generally indicated by numeral 22 has a bottom frame, rail or edge portion 22B and a top frame, rail, or edge portion 22T joined to each other at opposite ends by frame end or rail segments 22a and 22b. The frame 22 surrounds the windshield 20 in sealed relation thereto and is mounted in a vehicle body having a roof portion 22R and a cowl portion 22C. Wiper blades 24a, 24i, and 24b carried by arms 25a, 25i, and 25b attached to shafts 26a, 26i, and 26b respectively, are provided to sweep surface areas 20a, 20i, and 20b. The intermediate blade 24i and arm 25i form a wiper assembly provided adjacent to and centrally located relative to the bottom portion 22B of the frame whereas outer blades 24a and 24b carried by arms 25a and 25b respectively, form wiper assemblies provided adjacent to and located laterally outwardly relative to top portion 22T of the frame. In the embodiment of Fig. 1, an intermediate wiper assembly including wiper blade 14i and arm 15i is provided adjacent to and centrally located relative to the top portion 12T of frame 12 and the outer blade and arm assemblies are mounted adjacent to the bottom portion 12B of the frame 12.

The blades of the cleaning mechanisms of Figs. 1 and 2 have wiping angles outlined in phantom as $X_1°$ and $X_2°$ for blades 14a and 24a, $Y_1°$ and $Y_2°$ for blades 14i, and 24i, and $Z_1°$ and $Z_2°$ for blades 14b and 24b. The wiping angles $X_1°$ and $Z_1°$ are equal to each other for the cleaning mechanism arrangement of Fig. 1. The wiping angles $X_2°$ and $Z_2°$ are equal when the cleaning mechanism is arranged as disclosed in Fig. 2. The blades as shown in Figures 1 and 2 are in the so-called "park" or off position located at or substantially adjacent to a terminus of a stroke of the blade and arm in one direction. Shafts to which the blade arms are attached can be cammed away from the windshield for rail clearance if needed.

As to sequence of blade wiping action, blades on shafts 16a, 26a and shafts 15b, 26b are moved to cause blades to wipe outer surface portions of the windshield in a sweep covering the arcuate space included in the phantom outlines of arcs in Figures 1 and 2. Similarly, shafts 16i and 26i are driven to cause blades to wipe intermediate surface portions complementary between the outer blades and surface portions. At least 75% of windshield surface area is wiped by using the cleaning mechanism of the present invention. When mounted as shown in Fig. 1, the outer blades wipe upwardly and the intermediate blade wipes downwardly as indicated by arrows. When mounted as shown in Fig. 2, the outer blades wipe downwardly and the intermediate blade wipes upwardly as indicated by arrows. It is to be understood that the arrows indicate only one direction of movement of the reciprocable blades and that there is a reversal of the direction of movement at a terminus of a stroke in one direction.

None of the three blades in the arrangement of either Fig. 1 or Fig. 2 can ever bind or strike against another blade. As the blades sweep the angular areas outlined, the blades reach a position representing one half of the wipe angles and the blades and arms outlined in phantom in these vertical positions are marked 14x—15x, 24x—25x; 14y—15y, 24y—25y; and 14z—15z, 24z—25z, respectively. The blades and arms are synchronized for movement in a common direction as shown by the arrows and no interference ever occurs because each individual path is covered progressively in a manner such that the blades and arms cover the outlined areas. The total area covered by the wiper blades arranged as shown in Fig. 1 is greater than that covered by the blades as shown in Fig. 2 because overlap areas 17a, 17b are smaller than overlap areas 27a, 27b.

Figure 3:
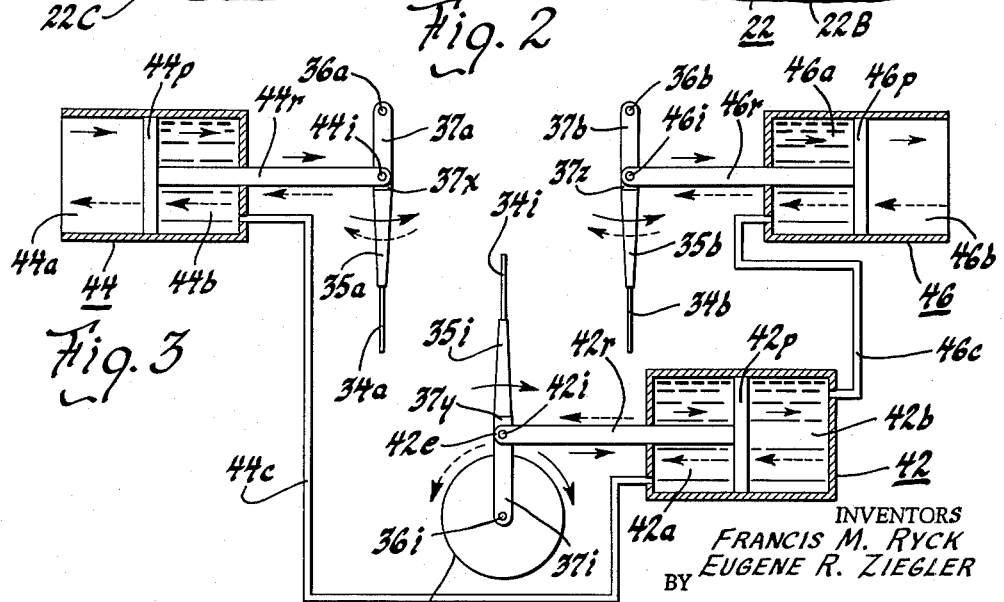
Fig. 3 shows a schematic diagram of a windshield wiping system for actuating multiple wiper blades shown in Figs. 1 and 2 in accordance with the present invention.

In Fig. 3 there is a schematic diagram representing a powering system whereby the multiple wipers of the arrangements of Figures 1 and 2 can be driven in synchronizm. Other blades are numbered 34a, 34i, and 34b in Fig. 3 corresponding to similar numbering applied in Figures 1 and 2. These blades are carried by arms 35a, 35i, and 35b which are attached to transmission shafts 36a, 36i, and 36b, respectively. Suitable driving or transmission means are to be connected to each shaft and, in Fig. 3, bell crank means or levers 37a, 37i, and 37b are shown attached to shafts 36a, 36i, and 36b at ends thereof remote from the ends to which the blade arms are connected. It is to be understod that a cable and pulley driving arrangement can also be used to effect shaft and wiper blade oscillation.

In accordance with the present invention, the windshield wiper powering system of Fig. 3 can be used with either of the wiper arrangements of Fig. 1 or Fig. 2. A single motor means generally indicated by numeral 40 is provided to effect driving and oscillation of all of the wiper blade assemblies including the two outer blades and intermediate blade. The motor means 40 is preferably an electric motor but can also be a fluid differential-pressure type of motor operable by using suitable connection and control with a vacuum source such as an engine manifold. The motor means 40 is provided preferably with the intermediate blade, arm, and shaft assembly. Thus in the system of Fig. 3, the blade 34i and arm 35i are connected to motor or power transmission shaft 36i. The lever 37i is attached to shaft 36i also and a lever end 37y remote from the shaft 36i is pivotally connected by a pin or pivot member 42i to an end 42e of a rod 42r attached to piston 42p reciprocably disposed in a cylinder means or fluid actuator generally indicated by numeral 42. The piston 42p divides space inside the fluid actuator 42 into opposite end chambers 42a and 42b. Each of these chambers 42a and 42b is filled with a fluid medium such as oil or air for transmitting pressure.

The lever 37a is attached at one end of shaft 36a and an opposite lever end 37x is connected by means of a pivot or pin 44i to a rod 44r attached to piston 44p reciprocally disposed in a cylinder means or fluid actuator generally indicated by numeral 44. The piston 44p divides space within the cylinder or fluid actuator 44 into opposite end chambers 44a and 44b. End chamber 44a is open to atmosphere as shown. End chamber 44b is filled with the same fluid medium as is used in chamber 42a of fluid actuator 42. A conduit 44c connects chamber 42a with chamber 44b and vice versa.

The lever 36b is attached at one end to shaft 37b and an opposite lever end 37z is connected by means of a pivot or pin 46i to a rod 46r attached to piston 46p reciprocally movable in a cylinder means or fluid actuator generally indicated by numeral 46. The piston 46p divides space within the cylinder or fluid actuator 46 into opposite end chambers 46a and 46b. End chamber 46b is open to atmosphere as shown. End chamber 46a is filled with the same fluid medium as is used in chamber 42b and 42a of fluid actuator 42. A conduit 46c connects chamber 42b with chamber 46a and is adapted to permit displacement of fluid medium from chamber 42b to chamber 46a and vice versa.

It is to be understood that the unitary motor means 40 which oscillates the intermediate or center blade assembly also controls movement of the outer or outside blade assemblies and thereby assures that blade movement is synchronized at all times. Using the powering system of Fig. 3 makes it possible to drive the center blade and arm from an electric motor and the outer blades and arms by fluid under pressure. The actuator 42 is in effect a hydraulic pump means which is driven by the motor means 40 and which is connected in a closed system to actuators or hydraulic motors 44 and 46 for actuating the outer wiper blades. Suitable sealing means can be provided for pistons 42p, 44p, and 46p relative to the cylinders in which the pistons are reciprocable.

When motor means 40 drives blade 34i and arm 35i to the right as viewed in Fig. 3, that is, in the direction of solid arrows, the lever 37i drives or pushes rod 42r and piston 42p to the right and fluid medium is forced to the right in the direction of solid arrows. Fluid medium such as a gas or oil in the closed system is displaced from chamber 42b through conduit 46c into chamber 46a and causes movement of piston 46p to the right thereby pulling rod 46r and lever 37b for turning blade 34b and arm 35b to the right about the axis of shaft 36b in the direction of the solid arrows. Movement of piston 42p to the right results in a void in chamber 42a and atmospheric pressure in space 44a or the like such as could be applied by a spring against the left side of piston 44p causes fluid medium in chamber 44b to be displaced through conduit 44c into chamber 42a where the void is immediately filled with fluid medium. As piston 44p is shifted to the right, the rod 44r attached to lever 37a causes movement of blade 34a and arm 35a in the direction of solid arrows about the axis of shaft 36a.

As motor means 40 reaches a terminus of movement causing wiper blade strokes in the direction of the solid arrows, a reversal of operation occurs as represented by dotted arrows opposite in direction of the solid arrows. Then piston 42p is driven or pulled to the left as indicated by dotted arrows and fluid medium from chamber 42a is displaced through conduit 44c into chamber 44b and there is corresponding movement of piston 44p transmitting actuating force through lever 36a to arm 35a and blade 34a about the axis of shaft 37a in the direction of dotted arrows. Atmospheric pressure in space 46b now effects a following action of 46p for forcing fluid medium from chamber 46a through conduit 46c into chamber 42b to fill a void which would otherwise exist on one side of piston 42p. Movement of piston 46p effects movement of rod 46r and lever 37b for driving the blade 34b and arm 35b about the axis of shaft 36b in the direction of the dotted arrows.

In the windshield wiping system of the present invention, three wiper blades are thus symmetrically oscillated, or driven in a substantially in phase relationship and have a stroke ranging between 90° and 180° as driven by a unitary motor means 40. Use of one large wiper blade could not effect a cleaning of at least 75% of the area of a wrap-around windshield as effected by three synchronized blades driven from a unitary motor means 40. The strokes of the three wiper blades overlap only slightly. Providing two outer blade assemblies on one side of a frame as well as an intermediate blade assembly on an opposite side of the frame assures that no wiper blades collide or interfere with each other as the center mounted blade and arm have a stroke of substantially 180° while the outer arm and blade assemblies have a stroke somewhat greater than 90°. The solid and dotted arrows represent movement in opposite directions.

While the embodiments of the present invention constitute preferred forms, it is to be understood that other forms might be adopted.

What is claimed is as follows:

1. A windshield wiping system for a vehicle, comprising, three wiper blades, each of which is carried by arms attached to separate spaced shafts, two of said shafts being mounted adjacent to one edge of the windshield, the third of said shafts being mounted adjacent to an opposite edge of the windshield between said two shafts, an electric motor for driving said intermediate shaft and blade thereof, a pump means connected to be driven by said electric motor as said motor drives and oscillates said intermediate shaft and blade, said pump means having opposite chambers filled with a fluid medium displaceable by actuation of said pump means through connection to said electric motor, and fluid motor means each having a chamber connected to one of the opposite chambers of said pump means, said fluid motor means including pistons capable of being displaced by said fluid medium and connected to oscillate said outer shafts carrying blades thereon.

2. A windshield cleaning system including, three wiper blades adapted to clean an associated windshield, three spaced shafts for actuating said wiper blades, two of said shafts being mounted adjacent one edge of said windshield and the third shaft being mounted adjacent the opposite edge of said windshield between said two shafts, the spacing of said shafts being such that the area wiped by the blade driven by said third shaft overlaps a portion of the area wiped by the blades driven by said two shafts, and motive means for driving said shafts to oscillate said blades to and fro across said windshield in phase relationship comprising an electric motor for oscillating said third shaft, a fluid pump actuated by said electric motor in timed relation with the oscillation of said third shaft and a pair of fluid motors connected wiht said two shafts having a closed fluid circuit connection with said pump.

References Cited in the file of this patent

UNITED STATES PATENTS

| 2,680,262 | Jorgensen | June 8, 1954 |
| 2,825,919 | Horton | Mar. 11, 1958 |

FOREIGN PATENTS

| 481,141 | Italy | May 23, 1953 |
| 570,336 | Germany | Feb. 15, 1933 |
| 625,939 | France | Aug. 23, 1927 |